United States Patent [19]

Kiss, Jr.

[11] 4,318,389

[45] Mar. 9, 1982

[54] POWERFUL, COLLAPSIBLE, COMPACT SPEAR GUN

[76] Inventor: Zoltan C. Kiss, Jr., 1257 Calle Castano, Thousand Oaks, Calif. 91360

[21] Appl. No.: 189,723

[22] Filed: Sep. 22, 1980

[51] Int. Cl.³ .............................................. F41B 7/04
[52] U.S. Cl. ..................................... 124/22; 124/45; 124/31; 124/80
[58] Field of Search .................. 124/17, 22, 41 R, 45, 124/80, 86, 84, 1; 43/6

[56] References Cited

U.S. PATENT DOCUMENTS

| | | | |
|---|---|---|---|
| 3,016,891 | 1/1962 | Ebeling | 124/22 |
| 3,340,642 | 9/1967 | Vasiljevic | 124/22 X |
| 3,741,190 | 6/1973 | Lopez | 124/41 R X |

*Primary Examiner*—Richard C. Pinkham
*Assistant Examiner*—William R. Browne
*Attorney, Agent, or Firm*—Poms, Smith, Lande & Rose

[57] ABSTRACT

A spear gun is collapsible to approximately one-half of the full length of a conventional spear gun by the use of both (1) a spear made of two parts and (2) by the use of a hollow shortened spear gun housing from which an extension for holding the slings or elastics for propelling the spear may protrude. The extension is slidably mounted within the hollow spear gun housing and has at its outer end a sling holder, or arrangements for holding the slings or elastics. The spear has a threaded coupling halfway along its length so that the spear may be unthreaded and the two parts thereof both secured along the length of the housing. One of the parts may be stored on the gun when the gun is not in use. A special compact trigger mechanism may include a release shaft in the hand grip of the spear gun which interfits with a recess in the spear, and is provided with a thumb actuated release. Concurrently with releasing the spear, the other end of the shaft includes a mechanism which releases the spear retaining line.

11 Claims, 5 Drawing Figures

U.S. Patent   Mar. 9, 1982   4,318,389
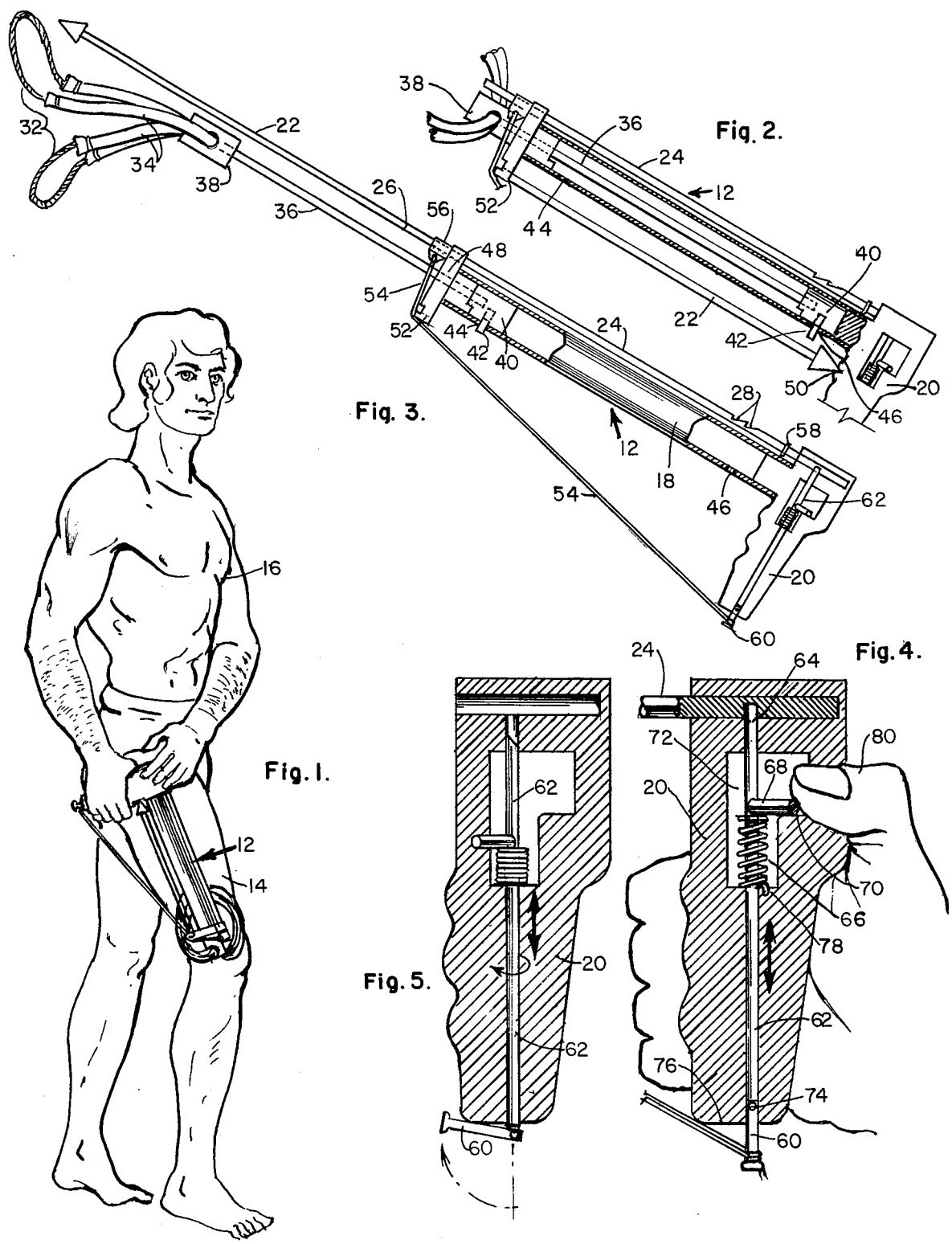

POWERFUL, COLLAPSIBLE, COMPACT SPEAR GUN

BACKGROUND OF THE INVENTION

The present invention relates to marine spear guns, and more particularly to compact spear guns which are readily portable.

Conventional spear guns are bulky and cumbersome, and their resistance to water flow slows down the skin-diver as he swims through the water. In addition, the substantial size and length of a conventional spear gun greatly hampers the skin diver and restricts his mobility, as well as making it difficult for the swimmer to traverse relatively narrow passageways.

It has previously been proposed to provide spear guns which are somewhat smaller and have a reduced length, as compared with conventional spear guns, but these have a number of disadvantages. More specifically, the length of the spear is reduced, and the arrangements for propulsion are more complex in view of the shorter distance through which the propelling elastics are applying force to the spear.

Accordingly, a principal object of the present invention is to provide a spear gun which is more compact and easier for the user to carry and wear while swimming, but which still has the power and other advantages of a conventional spear gun during normal operation.

SUMMARY OF THE INVENTION

In accordance with a specific illustrative embodiment of the present invention, a spear gun may include a hollow main housing having a length approximately half of the length of a conventional spear gun and having a hand grip secured to one end of the housing. An accompanying spear is formed in two parts so that it may be taken apart or folded for securing along the side of the housing, but may still be assembled into a rigid full-length spear configuration. An extension is slidably mounted within the hollow housing and may be extended outwardly for a distance approximately equal to the length of the housing and secured firmly in its extended position, and this extension includes at its outer end arrangements for securing the elastics which propel the spear.

A spear gun is therefore provided which may be mounted in a holster along the user's thigh, when it is not in use, and may be quickly reassembled into a full length spear gun configuration having substantially all of the power, accuracy and other capabilities of a conventional spear gun.

In accordance with other aspects of the invention:

1. A compact trigger mechanism may include a release shaft extending through the hand grip, and interfitting with a recess in the spear, and including a thumb-actuated release lever.

2. The release shaft may be arranged to move downward and away from the spear, and as the spear is released by movement of the shaft out of the recess in the spear, the other end of the spear release shaft is arranged to release the coiled line which is secured to the spear, to permit its recovery after use.

3. Locking arrangements are provided for firmly holding the extension in its advanced position against the force of the spear-propelling elastics.

4. The housing may be provided with a supplemental retaining structure for holding the (disassembled or collapsed) forward portion of the spear along the side of the housing, in parallel with the rear portion of the spear which may be mounted in its normal operative location.

In addition to the basic advantage of having a spear gun which is approximately half of the length of a normal spear gun, an additional reduction in length is achieved by the use of the compact thumb-actuated release shaft mechanism, as noted in paragraphs 1 and 2 above. More specifically, where most conventional spear guns have a standard type of index finger operated trigger mechanism, which requires four to six inches of distance along the length of the spear shaft, the present arrangements only occupy about two or three inches, and permit the extension of the spear substantially to the rear end of the spear gun housing. In addition to greater compactness, the release mechanism is greatly simplified as compared with standard spear gun trigger mechanisms.

Other objects, features and advantages of the present invention will become apparent from a consideration of the following detailed description and from the accompanying drawings.

BRIEF DESCRIPTION OF THE DRAWINGS

FIG. 1 shows the spear gun of the present invention in its "collapsed" or portable configuration, mounted along the upper leg of the user;

FIG. 2 is a somewhat enlarged showing of the illustrative spear gun in its collapsed, compact configuration;

FIG. 3 shows the spear gun in its operative fully-extended configuration, but with the propelling elastics not yet attached to the spear;

FIG. 4 is a detailed showing of the thumb-actuated spear release mechanism prior to release of the spear; and FIG. 5 shows the release mechanism of FIG. 4 following the release operation.

DETAILED DESCRIPTION

Referring more particularly to the drawings, in FIG. 1 the compact spear gun assembly 12 is shown mounted on the thigh 14 of a skin diver 16. The compact spear gun assembly 12 in its collapsed, or "stored" configuration is easily carried on the side of a swimmer's thigh and is secured in position either by suitable straps (not shown) or in a light-weight scabbard.

The overall arrangements of the spear gun assembly 12 (1) in its collapsed or stored configuration and (2) in its extended or operative configuration, are shown in FIGS. 2 and 3, respectively. As shown in these two Figures, the spear gun assembly includes a main hollow housing 18, with a handle 20 secured to one end thereof.

Referring to FIG. 3, it may be seen that the spear is made up of two sections 22 and 24, which have a threaded joint 26 by which they are firmly interconnected. For example, one of the two sections has a tapped hole in its end, and the other section is provided with a threaded extension. The spear section 24 is provided with a set of notches 28 into which the cords 32 tied to the elastic propelling elements 34 are located. The forwardly protruding extension member 36 is provided with a plastic element 38 at its front end through which the elastic propelling elements 34 extend. At the other end of the extension member 36 is a plastic member 40 which slides forward and back within the hollow tubular space within the main frame member 18. The plastic slide member 40 is provided with a locking pin 42 spring biased away from the plastic member 40 to interfit with the hole 44 toward the front of the housing 18 to lock the extension 36 in its forward position.

In addition, the housing 18 is provided with a second opening 46 near the hand grip 20, through which the pin 42 may extend to lock the slide 40 in the retracted configuration as shown in FIG. 2. When the extension member 36 is in the retracted position, as shown in FIG. 2, the front plastic member 38 is drawn back substantially against the front frame member 48 which closes the front end of the hollow main housing 18.

Incidentally, the extension shaft 36 passes through a close fitting opening in the forward closure member 48 to provide additional rigidity and support for the front extension member 36 when it is locked in its operative, extended position. The front portion 22 of the spear assembly, when it is unscrewed from the rear portion 24, is secured in a recess 50 in the handle 20 and by a clamping recess 52 at the lower end of the front closure element 48.

In order to avoid loss of the spear 22, 24, after it has been released, a line 54 is attached to the spear through a slide 56, which is picked up by the ring 58, secured to the rear portion 24 of the spear. Simultaneously with the release of the spear, the coiled line 54 is released from the restraining pin 60, as described in greater detail below. With one end of the line 54 secured to the front closure member 48 and the other attached to the spear, as mentioned above, the skin diver may readily recover the spear, and, hopefully, the catch.

The thumb operated spear release mechanism, including the shaft 62 extending through the handle 20, will now be described in greater detail in connection with FIGS. 4 and 5 of the drawings. More particularly, when the spear gun is ready for operation, as shown in FIG. 3 but with the elastics stretched and with the cords 32 in the notches 28, the upper end of the release shaft 62 extends securely into the recess 64 in the rear portion 24 of the spear. The spring 66 exerts an upward biasing force on the shaft 62 to assist in retaining it in the recess 64; and the angular thumb release member 68 overlies a shoulder 70 on the recess 72 on one side of the handle 20 to further insure holding of the upper end of the release shaft 62 into the notch 64 in the spear.

The upper surface of the end of the shaft 62 is provided with an angular bevel. In FIG. 4 this beveled surface is facing away from the viewer of the Figure. Accordingly, as the release element 68 is rotated in the forward direction, the bevel will be rotated toward the rear of the spear gun, and the force of the stretched elastic members 34 will release the spear, forcing the release shaft 62 downwardly. This downward movement of the shaft 62 also shifts the location of the pivot point 74, by which the line release member 60 is connected to the main release shaft 62. As the release shaft 62 moves down, the pivot point 74 reaches the lower surface 76 of the handle 20, thereby permitting the line release element 60 to tilt forward to release the line, as shown better in FIG. 5.

Concerning one minor additional feature of the invention, the spring 66 may be mounted with one end recessed into the handle housing 20 at point 78, and the other end secured to the shaft 62 to provide both an upward biasing force to the shaft 62 and also a counter clockwise rotational biasing force through the shaft 62 when viewed from the upper end thereof. This will have the effect of holding the laterally extending arm 68 on the shoulder 70 until positively released by pressure from the skin driver's thumb 80.

Concerning reduced length spear guns, reference is made to N. Ebeling U.S. Pat. No. 3,016,891 in which a reduced length spear gun is proposed. However, a complex pully arrangement is provided for the elastic slings, and angular accuracy is sacrificed as a result of the reduced operative length. The Ebeling patent is also of interest in its showing of a conventional index finger operated trigger mechanism which takes up unnecessary longitudinal space, and lengthens the spear gun, as compared with the compact release arrangements constituting one feature of the present invention.

Also, regarding dimensions, the spear gun shown in the present drawings has a "collapsed" or "stored" length of approximately 17½", as shown in FIG. 2; and an extended length of approximately 2 feet, 2 inches, excluding the spear. With the spear in place, the overall length as shown in FIG. 3 is approximately 2 feet, 4 inches.

Normal full-size spear guns vary in length from about 3 feet to 5 feet or more in length. In the case of the spear gun of the present invention, with the additional savings in length provided by the compact release mechanism, its power is comparable to that of the conventional 3 foot spear guns.

It is to be understood that the foregoing description and the showing of the drawings are merely illustrative of the principles of the invention. Thus, for example, instead of having a spear which has two sections which are threaded together, the spear may have two closely adjacent pivot points and outer sleeve arrangements or another mechanical mechanism for locking the two sections together. In addition, instead of sliding within the hollow frame member 18, the forwardly extending member 36 may be pivoted with respect to the main frame member or could slide along its outer surface. Further, the spear release mechanism may be provided with the safety to insure against inadvertent release of the spear. Also, instead of the pivot point 74, the line release member 60 may be coupled to the main release shaft 62 by an enclosing coil spring. Other similar mechanical alternatives to the arrangements shown and described hereinabove may also be employed. Accordingly, it is to be understood that the present invention is not limited to that precisely as shown and disclosed hereinabove.

What is claimed is:

1. A powerful, collapsible, compact marine spear gun, comprising:
 a hollow main housing having a transversely extending hand grip secured to one end thereof;
 a spear for use with said spear gun, said spear being formed in at least two detachably connected parts, and including means for permitting compact storage of one of said two parts on said gun spaced from the other of said two parts, each part of said two parts having a length approximately one-half of the spear's full length, and means for holding, in a launching position, the two parts of said spear rigidly when in a connected full spear length configuration;
 elastic sling means for propelling said spear;
 elongated extensible support means slidably mounted in said hollow main housing, said support means having a retracted position in which it is substantially within said housing and the extended operative position where it extends outwardly from said housing in the direction away from said grip by a distance approximately equal to the length of said housing; said support including at its outer end means for holding said elastic sling means;

means on said spear for coupling to said elastic means when they are stretched and extended; and means mounted in said housing near said grip for retaining said spear against the force of said elastic means; and thumb actuated means for releasing said spear;

whereby said spear gun may be collapsed to about one half the length of a conventional spear gun when not in use, to facilitate mobility of the user, but still has the power of a conventional spear gun when in its operative, fully-extended configuration.

2. A powerful, compact spear gun, as defined in claim 1, further including a line release mechanism located at the lower end of said hand grip, and means for releasing said line release element when said release means for the spear is actuated.

3. A powerful compact spear gun, as defined in claim 1 wherein said spear retaining means includes a release shaft extending through said hand grip.

4. A powerful compact spear gun as defined in claim 3 wherein a line release element is directly coupled to said release shaft at the lower end of said grip, and means are provided for permitting forward movement of said line release element to release the line, as said release shaft shifts position to release the spear.

5. A powerful compact spear gun as defined in claim 1 wherein means are provided for securing the two parts of said spear together by screw threads.

6. A powerful, compact spear gun, as defined in claim 1, further comprising means for mounting the two parts of said spear in its one-half full length configuration firmly onto said main housing.

7. A powerful, collapsible, compact marine spear gun, comprising:

a main housing having a transversely extending hand grip secured to one end thereof;

a spear for use with said spear gun, said spear being formed in at least two parts, and including means for permitting compact storage of said spear with a length approximately one-half of its full length, and means for holding the two parts of said spear rigidly in a full spear length configuration;

elastic sling means for propelling said spear;

elongated extensible support means mounted on said housing, said support means having a retracted position in which it is substantially coextensive with said housing and an extended operative position where it extends outwardly from said housing in the direction away from said grip by a distance approximately equal to the length of said housing; said support including at its outer end means for holding said elastic sling means; and means on said spear for coupling to said elastic means when they are stretched and extended.

8. A powerful compact spear gun, as defined in claim 7, further comprising:

a release shaft extending through said grip and into restraining engagement with said spear; and means for rotating said release shaft and permitting movement of said shaft away from said spear to release said spear.

9. A powerful, compact spear gun, as defined in claim 8 wherein a line release element is directly coupled to said release shaft at the lower end of said grip, and means are provided for permitting forward movement of said line release element to release the line, as said release shaft shifts position to release the spear.

10. A powerful, compact spear gun, as defined in claim 7, further comprising:

a line storage and releasing element mounted on the bottom of said hand grip;

a spear release shaft extending substantially through said handle to selectively engage and restrain forward movement of said spear.

11. A powerful, compact spear gun, as defined in claim 10, wherein said line holding and releasing element is pivotally secured to said release shaft and means are provided for preventing said release element from pivoting by the walls of a hole through the handle as long as said release shaft is in engagement with said spear, but upon movement of said release shaft away from said spear, the line release element is free to pivot forward.

* * * * *